(12) United States Patent
Avner et al.

(10) Patent No.: US 11,314,572 B1
(45) Date of Patent: Apr. 26, 2022

(54) SYSTEM AND METHOD OF DATA ALERT SUPPRESSION

(71) Applicant: MICROSOFT TECHNOLOGY LICENSING, LLC, Redmond, WA (US)

(72) Inventors: Jon Barry Avner, Redmond, WA (US); Chen Wang, Sammamish, WA (US); Feng Tan, Bothell, WA (US); Chris Barrett, Seattle, WA (US); Ayyappan Balasubramanian, Redmond, WA (US); Maurizio Bruno Di Gianluca, Bellevue, WA (US); Srisaipavan Valluri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/246,603

(22) Filed: May 1, 2021

(51) Int. Cl.
G06F 11/07 (2006.01)

(52) U.S. Cl.
CPC ...... *G06F 11/0772* (2013.01); *G06F 11/0751* (2013.01); *G06F 11/0778* (2013.01)

(58) Field of Classification Search
CPC ............. G06F 11/0751; G06F 11/0772; G06F 11/0778

(Continued)

(56) References Cited

U.S. PATENT DOCUMENTS 8,862,250 B2 10/2014 Ko et al.
10,534,658 B2 1/2020 Li et al.

(Continued)

FOREIGN PATENT DOCUMENTS

EP 3179696 A1 * 6/2017 ........... G06F 21/554

OTHER PUBLICATIONS

"Alert Suppression—Achieve Better False Alerts Protection Through Dependency Configuration in Monitor Groups", Retrieved from: https://support.site24x7.com/portal/en/kb/articles/alert-suppression-%E2%80%93-achieve-better-false-alerts-protection-through-dependency-configuration, Retrieved Date: Mar. 5, 2021, 03 Pages.

(Continued)

*Primary Examiner* — Chae M Ko
(74) *Attorney, Agent, or Firm* — NovoTechIP International PLLC

(57) ABSTRACT

A method for providing automatic suppression of an alert includes receiving a first error associated with a first dataset, the first dataset being among a plurality of datasets in a computer data environment, accessing dependency data that describes a set of dependencies between the first dataset and other datasets, examining the dependency data to automatically identify a second dataset from among the other datasets, the second dataset being a dataset on which the first dataset depends, accessing alert data for the computer data environment to determine whether an active alert for the second dataset provides an indication that the first error is redundant to a second error associated with the second dataset, and upon determining that the first error is redundant, suppressing transmission of the alert and storing data about suppressing transmission in a data structure. In determining whether the first error is redundant to the second error, timing of data generation of the first and second dataset and timing of detection of the first error are considered.

20 Claims, 7 Drawing Sheets

(58) Field of Classification Search
USPC .......................................................... 714/57
See application file for complete search history.

(56) References Cited

U.S. PATENT DOCUMENTS

| | | | |
|---|---|---|---|
| 10,887,158 B2 | 1/2021 | Arora et al. | |
| 2005/0172306 A1 | 8/2005 | Agarwal et al. | |
| 2010/0100775 A1* | 4/2010 | Slutsman | G06F 11/079 |
| | | | 714/47.2 |
| 2010/0109860 A1* | 5/2010 | Williamson | G08B 29/22 |
| | | | 340/508 |
| 2014/0149568 A1* | 5/2014 | Kruempelmann | H04L 41/0622 |
| | | | 709/224 |
| 2015/0350146 A1* | 12/2015 | Cary | H04L 51/14 |
| | | | 709/206 |
| 2017/0195183 A1* | 7/2017 | Gershaft | H04L 41/22 |
| 2019/0360448 A1* | 11/2019 | Kita | F02P 3/05 |
| 2020/0252264 A1* | 8/2020 | Arora | H04L 41/0631 |

OTHER PUBLICATIONS

Goyal, et al., "Real-Time Data Lineage at UBS", Retrieved from: https://neo4j.com/blog/real-time-data-lineage-ubs/, Apr. 11, 2019, 21 Pages.

* cited by examiner

SYSTEM AND METHOD OF DATA ALERT SUPPRESSION

TECHNICAL FIELD

This disclosure relates generally to suppression of data alerts and, more particularly, to an improved method of and system for suppression of data alerts based on data dependency.

BACKGROUND

Many organizations have begun turning to cloud storage to modernize their data storage infrastructure and workloads. As more and more organization use cloud storage, data as a service, (DaaS) is becoming an increasingly popular solution for data integration, management, storage, and analytics. Data construction and management in a DaaS or similar environment, however, can become very complex as it may involve a significant amount of data. For example, data construction in a DaaS environment may involve a variety of complex transformations and validations of incoming raw data streams in order to create externally consumable datasets. Each external dataset may go through several steps and make use of different data streams to be produced. As such, a dataset may depend on multiple other datasets. As the number of datasets and dependencies between them increases, management of these datasets becomes more complex.

One of the complexities of managing a large data storage environment is handling failures. To ensure that failures are addressed, when a failure or error relating to a dataset occurs, an alert is often generated to notify an administrator of the issue. When datasets depend on one another, a failure in one dataset may affect its dependent datasets. In large and complex data environment, this may result in numerous alerts being issued for the same failure. The different datasets may be managed by different engineering teams. As a result, an alert relating to the same failure may be sent to many different engineers or administrators who will then need to spend time reviewing and analyzing the failure and identifying solutions for it. This is inefficient, time consuming and redundant. However, identifying redundant alerts is challenging as the full dependencies of a given dataset can be quite complex, such that it is often extremely time consuming and beyond the ability of a human being to determine whether one dataset is dependent on another. As a result, most data environments issue redundant alerts for dependent datasets, resulting in wasted administrator time and computing resources.

Hence, there is a need for improved systems and methods for suppression of data alerts based on data dependency.

SUMMARY

In one general aspect, the instant disclosure describes a data processing system having a processor, and a memory in communication with the processor where the memory comprises executable instructions that, when executed by the processor, cause the data processing system to perform multiple functions. The function may include receiving, by an alert server, a first error associated with a first dataset, the first dataset being among a plurality of datasets in a computer data environment, accessing dependency data that describes a set of dependencies between the first dataset and one or more other datasets in the computer data environment, examining the dependency data to automatically identify a second dataset from among the one or more other datasets, the second dataset being a dataset on which the first dataset depends, accessing alert data for the computer data environment to determine that an active alert for the second dataset indicates that the first error is redundant to a second error associated with the second dataset, and in response to determining that the first error is redundant, suppressing transmission of an alert for the first error and storing data about the suppressed alert in a data structure of the computer data environment. Determining that the first error is redundant to the second error may be based on at least one of a timing of data generation of the first dataset, a timing of data generation of the second dataset and a timing of detection of the first error.

In yet another general aspect, the instant disclosure describes a method for providing automatic suppression of an alert, where the method includes the steps of receiving, by an alert server, a first error associated with a first dataset, the first dataset being among a plurality of datasets in a computer data environment, accessing dependency data that describes a set of dependencies between the first dataset and one or more other datasets in the computer data environment, examining the dependency data to automatically identify a second dataset from among the one or more other datasets, the second dataset being a dataset on which the first dataset depends, accessing alert data for the computer data environment to determine that an active alert for the second dataset indicates that the first error is redundant to a second error associated with the second dataset, and in response to determining that the first error is redundant, suppressing transmission of an alert for the first error and storing data about the suppressed alert in a data structure of the computer data environment. Determining that the first error is redundant to the second error may be based on at least one of a timing of data generation of the first dataset, a timing of data generation of the second dataset and a timing of detection of the first error.

In a further general aspect, the instant disclosure describes a non-transitory computer readable medium on which are stored instructions that when executed cause a programmable device to receive, by an alert server, a first error associated with a first dataset, the first dataset being among a plurality of datasets in a computer data environment, access dependency data that describes a set of dependencies between the first dataset and one or more other datasets in the computer data environment, examine the dependency data to automatically identify a second dataset from among the one or more other datasets, the second dataset being a dataset on which the first dataset depends, access alert data for the computer data environment to determine that an active alert for the second dataset indicates that the first error is redundant to a second error associated with the second dataset, and in response to determining that the first error is redundant, suppress transmission of an alert for the first error and storing data about the suppressed alert in a data structure of the computer data environment. Determining that the first error is redundant to the second error may be based on at least one of a timing of data generation of the first dataset, a timing of data generation of the second dataset and a timing of detection of the first error.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
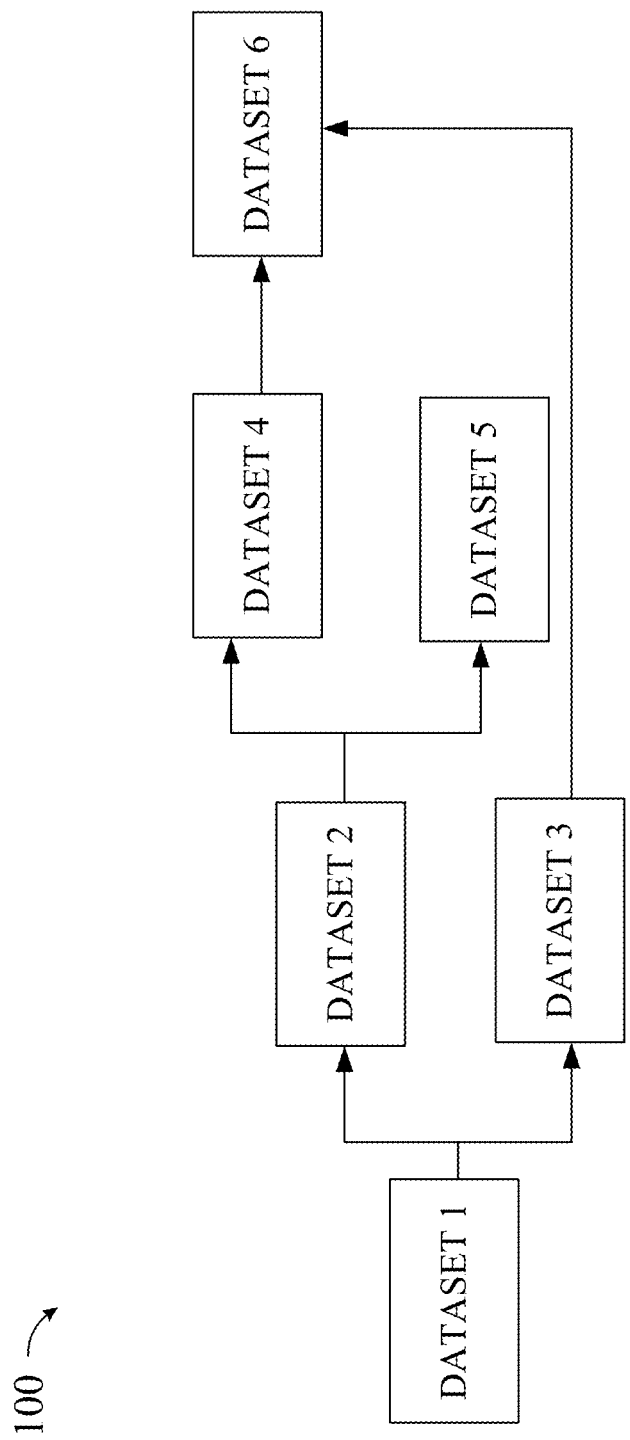
FIG. 1 depicts an example data environment upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Most enterprises monitor the operation of their computer systems and data environments to ensure system reliability and availability. This may be achieved by running various tests and/or utilizing monitoring tools that detect system and/or data issues (e.g., failures or erroneous system behavior). When a failure or erroneous behavior is detected, a mechanism is often used to alert an administrator (e.g., one or more engineering team members) to the detected issues. The alert is then examined by one or more users to determine how to address the issue and potentially avert one or more other failures (e.g., critical failures). The actions the user may take to handle the failure may include proactive system maintenance, engineering intervention, technical triage, and the like. The process of examining an alert, identifying solutions and applying the solutions to address the error is often complex and time consuming.

In complex data environments and systems, where multiple datasets depend on one another, a failure in one dataset can lead to failures in numerous other datasets. As a result, one failure in a root dataset can lead to numerous alerts being issued for many other datasets. Because different engineering teams are often responsible for different systems and datasets, the alert may be sent to multiple different teams. This may result in many different users spending time and resources to examine and attempt to address the same alert. This process is inefficient for the engineering teams.

Furthermore, because of the complexities of most data environments, determining the full dependency tree of a given dataset is a complicated task and often beyond the ability of human beings. As a result, determining the root cause of an alert for a dataset, when the alert is caused by a failure in another dataset, may be a challenging and complicated undertaking, and often unnecessary since another alert has been issued for the root dataset and another team may already be working on addressing the issue. Thus, there exists the technical problem of identifying and suppressing redundant alerts in complex data and computing environments.

To address these technical problems and more, in an example, this description provides a technical solution for automatically suppressing redundant alerts based on dependency of datasets. To achieve this, a mechanism may be used to examine a new alert, identify the dataset for which it was issued, determine the full dependency tree of the identified dataset to identify other active alerts in the dependency tree of the dataset, and determine if the new alert is redundant to one of the active alerts based on the dependency. Once the alert is identified as a redundant alert, it may be suppressed such that the alert is not transmitted to the responsible administrator or team. In some implementations, a report of suppressed alerts is prepared and sent to the responsible administrator or team. Additionally, a report of the alerts a root alert suppressed may also be prepared and transmitted to the administrator or team responsible for the root alert. In some implementations, when determining dependencies, date/time data is considered to ensure that correct dependencies are identified. Furthermore, when individual properties of datasets have different dependency chains from one another, the different dependency chains may be considered in determining dependency of datasets.

As will be understood by persons of skill in the art upon reading this disclosure, benefits and technical advantages provided by such implementations can include, but are not limited to, a technical solution to the technical problems of having inefficient, redundant, time-consuming and difficult to manage alerts in complex data and computing system environments. Technical solutions and implementations provided herein optimize and improve the process of issuing alerts in complex data and computing system environments by automatically identifying and suppressing redundant alerts, where the redundancy is based on dataset dependency. To ensure accurate identification of redundant alerts, the technical solutions and implementations provided herein may take into dataset property dependencies and/or date/time of data generation, thus increasing reliability and system health. The benefits provided by these technology-based solutions include providing increased user and system efficiency.

As used herein, the term "dependent" may refer to a dataset or system which receives and uses data from another dataset or system to generate its own dataset or output. Furthermore, as used herein, the term "dependency tree" or "lineage" may be used to refer to a set of dependencies between different datasets. The term "downstream" may be used to refer to a dataset that is dependent on another dataset. The term "upstream," on the other hand, may refer to a dataset on which another dataset depends. The term "error" may refer to any failure or erroneous behavior in a dataset or system component and may include missing, incorrect or expired data in a dataset.

FIG. 1 depicts an example simplified data environment 100 upon which aspects of this disclosure may be implemented. The environment 100 includes 6 different datasets, identified as Dataset 1, Dataset 2, Dataset 3, Dataset 4, Dataset 5 and Dataset 6, for ease of reference. As illustrated, multiple datasets in the environment 100 depend on one or more other datasets. The dependencies may be a result of a variety of incoming raw data streams being needed to generate each dataset. Thus, the resulting Datasets 1 through 6 may include one or more externally consumable datasets that are generated based on datasets from other datasets. Different administrator or engineering teams may be responsible for managing different datasets in the environment 100. For example, one engineering team may be responsible for managing Dataset 1, while a different engineering team is responsible for handling Datasets 2, 4 and 5. Another engineering team may be in charge of managing Datasets 3 and 6.

One or more datasets in a data environment may have dependencies on multiple other datasets. These may be direct dependencies or indirect dependencies. For example, Dataset 6 in the environment 100 is directly dependent on Datasets 4 and 3. Moreover, because Dataset 4 depends from Dataset 2, Dataset 6 is indirectly dependent on Dataset 2. However, both Datasets 2 and 3 are dependent on Dataset 1. As a result, Dataset 6 is indirectly dependent on Datasets 1 and 2, while being directly dependent on Datasets 4 and 3. Similarly, Datasets 4 and 5 are directly dependent on Dataset 2 and indirectly dependent on Dataset 1, while Datasets 2 and 3 are directly dependent only on Dataset 1. As a result, each of the Datasets 2 through 6 is dependent on Dataset 1. Dataset 2 has three dependent datasets: datasets 4, 5 and 6. Dataset 3, on the other hand, has only one dependent dataset, which is Dataset 6.

This illustrates that even in a simplified data environment, determining dependencies of various datasets can be complex. Real life data environments often include hundreds if not thousands of different datasets with complex dependencies. Identifying the lineage of a given dataset in such a system can quickly become difficult, time consuming and error-prone for a human being to perform. Furthermore, dependencies of datasets may sometimes change during the time it takes a human being to identify the lineage, thus making the entire or part of the lineage incorrect. Because of the complexities involved and because dependencies may change during the time it takes a person to determine the lineage, identifying the lineage of datasets in complex environments is beyond the ability of human beings. Yet, without identifying the full lineage of every dataset in the system, it is not possible to accurately and reliably suppress dataset alerts.

Different administrator or engineering teams may be responsible for managing different datasets in the environment 100. For example, one engineering team may be responsible for managing Dataset 1, while a different engineering team is responsible for handling Datasets 2, 4 and 5. Another engineering team may be in charge of managing Datasets 3 and 6. Thus, unless intelligent alert suppression is performed, an alert resulting from a failure in Dataset 1 may result in 6 alerts being transmitted to 3 different engineering teams. Furthermore, even if the same team is responsible for all 6 different datasets, it may take time for the team members to analyze the alerts and determine that they are redundant, which leads to waste of time and resources. To address these issues, the present disclosure provides the technical advantage of automatically determining dataset linages as it relates to alerts and intelligently suppressing redundant alerts.

Figure 2:
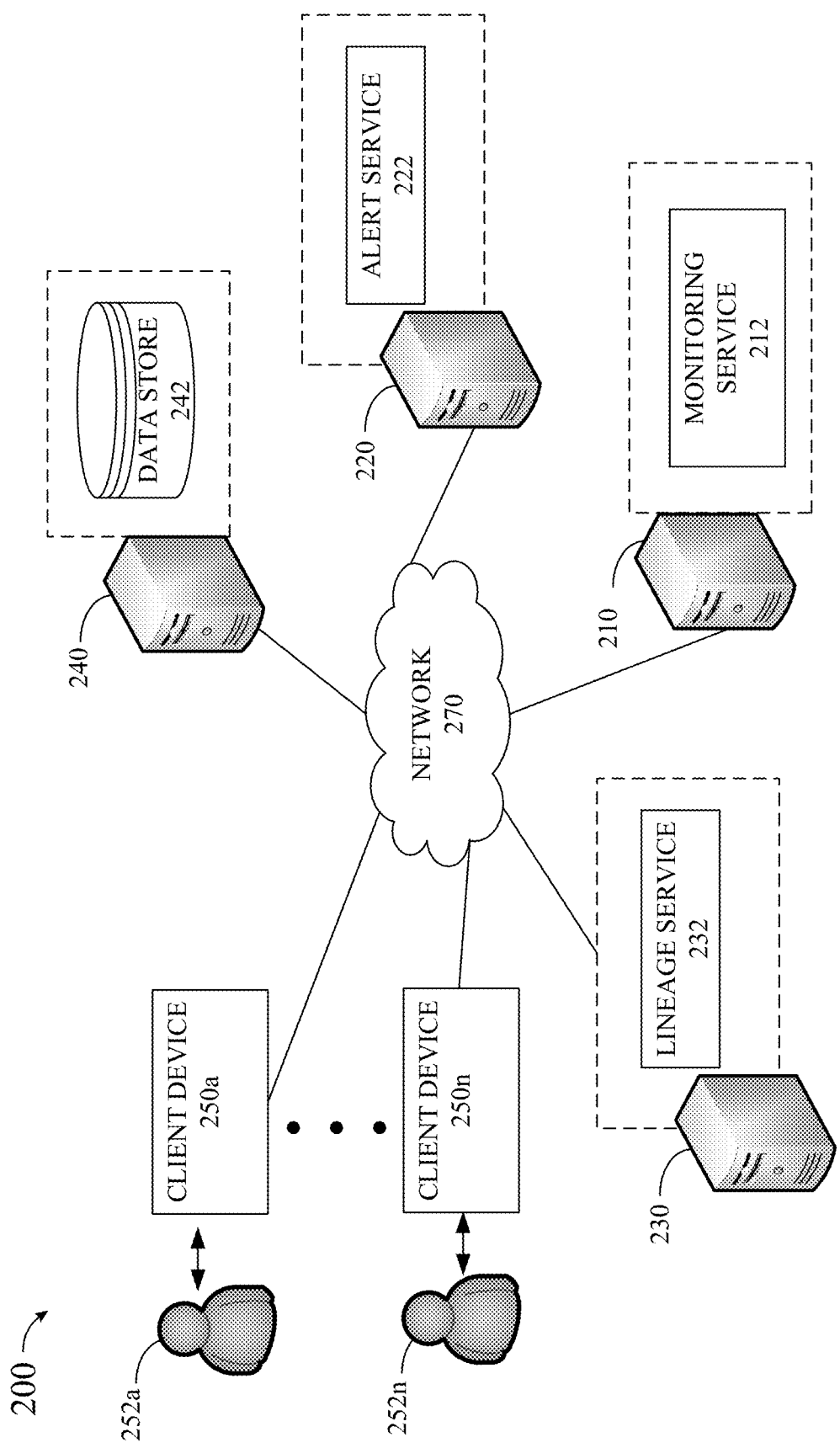
FIG. 2 depicts an example system upon which aspects of this disclosure may be implemented.

FIG. 2 depicts an example system upon which aspects of this disclosure may be implemented. In different implementations, the system 200 may include a monitoring server 210, an alert server 220, a lineage server 230 and a storage server 240. The monitoring server 210 may include and/or execute a monitoring service 212, while the alert server 220 may include and/or execute an alert service 222. The lineage server 230 may include and/or execute a lineage service 232. The storage server 240, on the other hand, may include a data store 242. The data store 242 may function as a repository in which multiple datasets may be stored.

Each of the servers 210, 220, 230 and 240 may operate as shared resource servers located at an enterprise accessible by various computer client devices such as client devices 250a through 250n. Each of the servers 210, 220, 230 and 240 may also operate as cloud-based servers for offering global monitoring, alert, lineage and storage services, respectively. Although shown as one server, each of the servers 210, 220, 230 and 240 may represent multiple servers for performing various different operations. For example, the monitoring server 210 may include one or more processing servers for performing different monitoring operations. In another example, the storage server 240 may include or represent multiple storage servers each having one or more data stores for storing data. Furthermore, although shown as separate servers, two or more of the servers 210, 220, 230 and 240 may be combined into one server. For example, the monitoring server 210 and alert server 220 may be combined such that the monitoring and alert services 212 and 222 are offered by the same server.

The monitoring service 212 may be responsible for monitoring for errors and/or failures in various datasets and/or other system components. As such, the monitoring service 212 may include and be representative of various monitoring tools and/or tests executed by one or more administrators and/or engineering teams for determining the health, availability (e.g., system up-time) and reliability (e.g., ability to meet performance requirements) of various datasets and/or system components. The monitoring and tests performed by the monitoring service 212 may be initiated automatically or by a user (e.g., an engineering team member). Different monitoring tools and/or tests may be utilized for different types of datasets and/or system components to detect erroneous behaviors. The tests may be performed periodically, for example, based on a predetermined schedule (e.g., once a day) and/or may be triggered by specific events, as needed. Once the monitoring service 212 detects an error in a dataset or a system component, the monitoring service 212 may transmit information about the error to the alert server 220 for processing.

The alert service 222 may provide intelligent alert processing and management for the system 200. As such, the alert service 222 may receive information about an error, determine which dataset or system component the error is related to, and determine if the error is for a new or an ongoing problem. In some implementations, the information received about the error may include information on the dataset or system component at which the error was detected, the time/date at which the error was detected, and/or the type of error. By examining this information, the alert service 222 may quickly identify the dataset or system component to which the error relates.

The alert service 222 may maintain a data structure (e.g., a log) of active errors. The data structure may include information such as the time/date an error was detected and/or received, the type of error, the dataset or system component to which it relates (e.g., the dataset at which it was detected), and/or whether an alert was generated for the error. In some implementations, the stored information also includes whether the error is active or has been resolved. This data may be stored in the alert server 220 or may be stored in a different storage medium (e.g., storage server 240).

When a new error is received, the alert service 222 may compare information about the new error to information stored in the data structure to determine whether the error is for a new issue or whether it relates to an ongoing issue that has not been resolved yet. If it is determined that the error is one for a new issue, the alert service 222 may transmit a request to the lineage service 232 to determine if the error is redundant to an error for which an alert has already been issued (e.g., for which an active alert exists). The request to the lineage service 232 may include information about the new error as well as all currently active errors in the system. In some implementations, additional information is provided which includes a time/date period for each active failure and/or properties of a dataset to which they relate.

When the response received from the lineage service 232 indicates that the error is redundant, the alert service 222 may suppress transmission of an alert for the error. This may involve creating a record for the error in the same data structure or a different one, which contains information about the error and identifying the error as redundant. The data structure may also include information on which alert the error was identified as being redundant to and/or the administrator or team responsible for the error.

This information may be used by the alert service 222 to generate a report for the administrator or team responsible for the error. These types of reports may be generated periodically, for example, based on a predetermined schedule (e.g., once a week) or may be requested or retrieved, as needed. Furthermore, a new report may be created when there is a change to a previous report (e.g., an additional alert gets suppressed against a root alert). The reports may be generated to keep each administrator or engineering team apprised of issues involving datasets for which they are responsible. This may be important, because even if an administrator is not in charge of addressing an error, they may need to be aware that their dataset is not functioning properly. By receiving a report of all suppressed alerts, the administrators may be kept informed of ongoing problems.

A different report may be generated for the administrator responsible for handling the root error that resulted in suppression of one or more alerts. This report may include information on errors caused by the root error for which an alert was suppressed. The report may be generated periodically, based, for example, on a predetermined schedule (e.g., once a day) or may be requested or retrieved, as needed. This type of report may be useful in determining the urgency and importance of an error. For example, the number of suppressed alerts for an error may be indicative of the number of datasets affected by the error. When numerous other datasets are affected by an error, the error may be identified as more urgent and as such more important to manage. In some implementations, when the number of suppressed alerts for an error exceeds a threshold (e.g., 10 alerts), a notification may be transmitted by the alert service 222 to the administrator responsible for the error. The notification may include the report of one or more errors that have been suppressed based on the root error.

When it is determined (e.g., based on information received from the lineage service 232) that an error is not redundant, the alert service 222 may generate an alert for the error. In some implementations, all errors create an alert but only non-redundant error result in creation of actionable alerts. An actionable alert may be an alert that results in a notification being transmitted to a user. The notification may include information on the error such as the dataset or system component to which it relates, the type of error, the date/time it was detected, and/or the type of test or monitoring performed to detect the error. The generated notification may then be transmitted to one or more administrators (e.g., an engineering team members) responsible for the dataset or system component to which the alert relates. This may be achieved by accessing a database containing information on administrators and datasets or system components that they manage. This database may be stored locally in the alert server 220 or stored remotely in a storage medium such as the storage server 240. The database may be accessible to various administrators and/or engineering teams to update and edit, as needed.

The generated alert may be transmitted by the alert server 220 to a client device such as client devices 250a to 250n of the responsible administrator. The client devices 250a to 250n may include any stationary or mobile computing devices configured to provide a user interface for interaction with a user 252a to 252n and/or configured to communicate via the network 270. For example, the client devices may include workstations, desktops, laptops, tablets, smart phones, cellular phones, personal data assistants (PDA), printers, scanners, telephone, or any other device that can be used to interact with the users 252a to 252n. The client devices 250a to 250n may be representative of client devices used by administrators (e.g., users 252a to 252n) in a system 200 to monitor, maintain and manage various datasets and/or system components. A complex data environment may require several different administrators and client devices. Once the alert is received by the user 252a to 252n, the responsible user may begin reviewing the alert and determining how to resolve the issue. Once the error has been corrected, the responsible user 252a to 252n may transmit an indication to the alert service 222. This may be achieved by utilizing a user interface screen of a system monitoring and/or alert application. When alert service 222 receives the indication that the error has been corrected, the data structure containing a log of the errors and/or alerts may be updated to flag the alert as inactive. In some implementations, after a given time period, inactive alerts may be deleted from the data structure.

The lineage service 232 may provide intelligent lineage and redundant error detection. To achieve this, the lineage service 232 may make use of information on datasets and/or system components in the system 200 to identify dependencies. This may involve accessing information on input datasets used by each dataset to generate the dataset, and may include examining the input datasets for each given dataset. This information may be retrieved from the storage server 240 or may be stored locally by the lineage service 230. It should be noted that the storage server used by the lineage service 232 may be the same or different from a storage server used by the alert service 222. In some implementations, the process involves examining the software code associated with each dataset to identify the input data used to generate each dataset.

By examining all datasets used for generating each dataset, the lineage service 232 may be able to identify direct dependencies of a given dataset. Once direct dependencies are identified, that information may be used to identify indirect dependencies. For example, referring to the data environment 100 of FIG. 1, once it is determined that Dataset 6 is dependent on Dataset 3 and Dataset 3 is dependent on Dataset 1, an inference is made that Dataset 6 is also dependent on Dataset 1. In some implementations, subset properties (e.g., specific datasets) of datasets are also examined, when determining dependencies. As discussed in more detail below with regard to FIG. 4, the time at which a given dataset is generated and the time window of data it consumes may also be taken into account when determining dependencies. In some implementations, the lineage service 232 maintains a database of lineage information for one or more datasets in the system 200 such that at any given time, the lineage information for those datasets is available and up to date.

When the lineage service 232 receives a request from the alert service 222 to identify dependencies for a new error, it may examine the lineage of the dataset to which the error relates and identify one or more currently active errors for upstream datasets. This may be achieved by comparing the lineage of the dataset (e.g., all other datasets on which the dataset depends) with the list of datasets having active errors, and determining if there is an overlap between those datasets. When a dataset having an active error is upstream to the dataset at issue, the new error may be identified as being redundant since it is likely caused by the same error. For example, in the environment 100 of FIG. 1, if an error relating to Dataset 5 is received, and an error relating to Dataset 1 is currently active, the error relating to Dataset 5 is identified as an upstream error and, as such, redundant.

In some implementations, other information such as the type of error, the time/date it was detected, the time/date the dataset at issue was generated, and the like may also be considered in determining if the new error is redundant to an active error relating to an upstream dataset. Once the lineage service 232 identifies the new error as redundant or non-redundant, it transmits information about the determination to the alert service 222, which will in turn process the information to determine if it should generate or suppress an alert.

In some implementations, the lineage server 230 may receive the information on the new error and all active errors in the system 200 and generate a list of all errors that are upstream to the new error. This list may be transmitted by the lineage server 230 to the alert service 222. The alert service 222 may then examine the list to determine if the new error requires generation and transmission of an alert or whether it should be suppressed. In some implementations, the alert service 222 requests to receive information on one dependency level at a time from the lineage service in order to keep the requests and responses relatively small. This may occur in implementations where a dataset has a large number of dependencies and/or a large number of failures are occurring in the system at once. To prevent the need to include a significantly large number of dataset IDs in a single request or response, the request and/or response may occur in smaller batches. It should be noted that, although shown as being housed in two different servers, the alert service 222 and the lineage service 232 may be included in the same server. Furthermore, one or more of the functions discussed here as being performed by the lineage service 232 may be performed by the alert service 222, and vice versa.

Various elements of the system 200 may be connected to each other via the network 270. For example, each of the servers 210, 220, 230 and 240 may be connected to one another via the network 270. Similarly, the client devices 250a to 250n may be connected to the alert service 222 and/or the monitoring service 212 via the network 270. The network 270 may be a wired or wireless network or a combination of wired and wireless networks.

Figure 3:
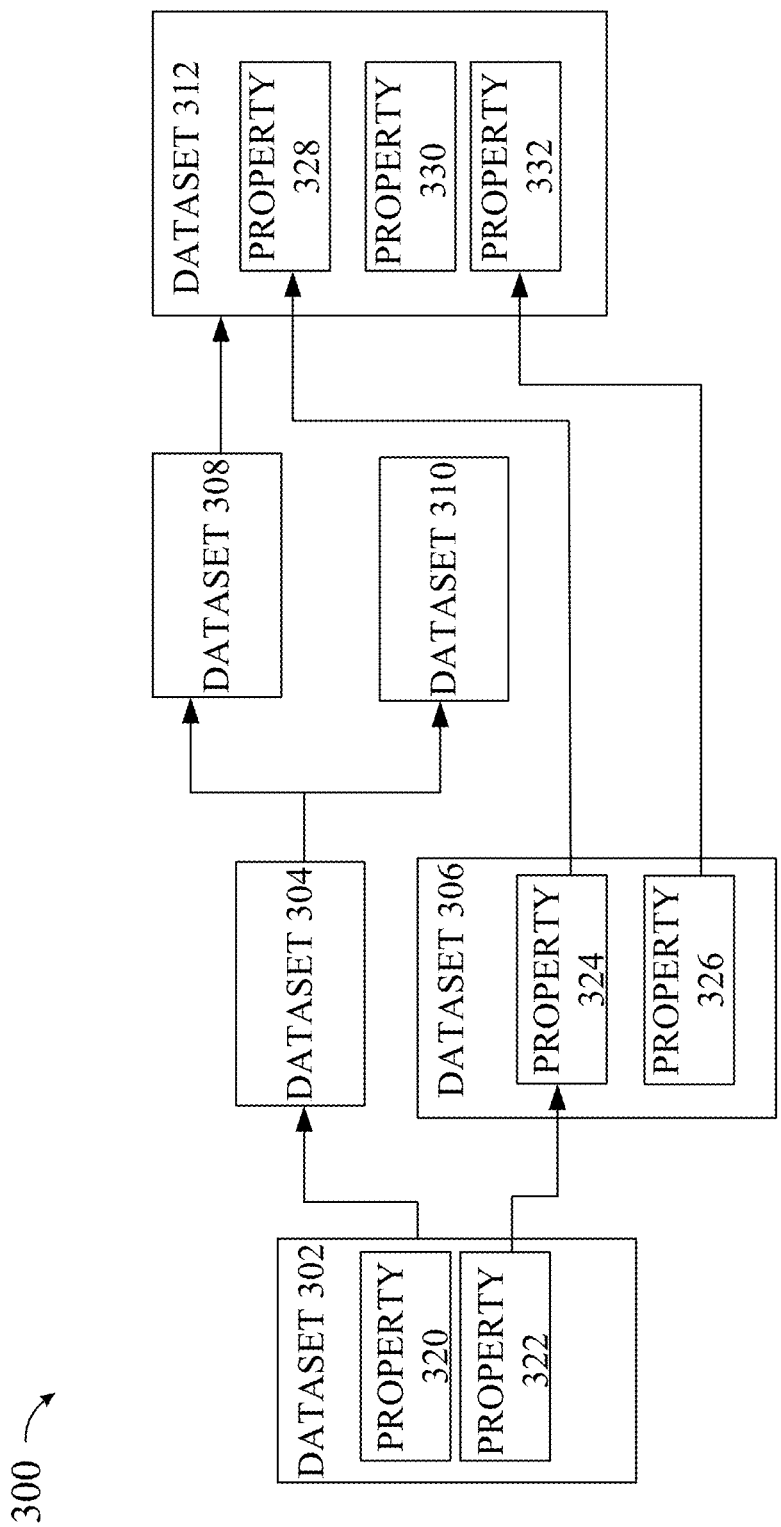
FIG. 3 depicts an example data environment in which subset of properties for datasets are considered in determining dependencies.

FIG. 3 depicts an example data environment in which some properties of one or more datasets have different dependency chains from other properties of the datasets. When a dataset depends on another dataset, the dependency may be related to a specific property of the downstream dataset, and not the entire dataset. For example, a given dataset may include multiple individual datasets and the upstream dataset may only make use of one of those datasets to generate its data. Because the dependency chain of a dataset as a whole is a union of dependencies of each individual property, the upstream dataset may be considered dependent on a downstream dataset even if only one of its properties is dependent on one of the properties of the downstream dataset. As a result, alert suppression that does not examine the individual dependency chains may sometimes classify a dataset as dependent on another, when the dependency is not based on the properties in question. To address this issue, in some implementations, dependencies of individual properties of datasets are considered when determining dependencies for the entire datasets.

Data environment 300 includes Datasets 302, 304, 306, 308, 310 and 312. Each of the Datasets 302, 306 and 312 may include multiple different properties. For example, Dataset 302 includes a property 320 and another property 322. Similarly, Dataset 306 includes a property 324 and a different property 326, while Dataset 312 includes properties 328, 330 and 332. When a dataset depends on one of the Datasets 302, 306 or 312, it may not depend on the entire dataset, but rather on one of their properties. For example, while Dataset 306 depends on the Dataset 302, it does not depend on the entire dataset, but only on property 322 of the Dataset 302. As a result, when a new error relating to Dataset 306 is examined, it may be prudent to determine which property the error relates to. If the error relates to property 324 and an active error exits for property 322 of Dataset 302, then the new error should result in alert suppression. However, if the active error relating to Dataset 302 is related to property 320 or if the new error of Dataset 306 relates to property 326, the alert should not be suppressed.

In another example, if an error is identified for Dataset 312, the properties of the dataset may be considered to determine if the error relates to a specific property (e.g., property 328, 330 or 332). Those properties may then be compared to properties on which they depend to determine redundancy. If the error relates to property 328 and an active error relating to one of the properties 324 or 322 exits, then the error may be suppressed. However, if the error relates to property 328 and an active error relating to one of the properties 326 or 320 exits, then the error may not be suppressed. Similarly, a new error relating to property 332 may only be suppressed if an active error relating to property 326 exits. Since, property 330 does not depend on any properties of Datasets 302 or 304, if the new error relates to property 330, any active error relating Datasets 306 and 302 may not result in suppression of the new error. In this manner, specific individual properties of datasets may be considered to provide more accurate and specific alert suppression. It should be noted that tracking dependencies at the property level is an implementation choice that provides greater granularity of dependencies. However, the mechanisms described herein can also be used effectively even at the dataset level without taking individual properties into account.

Figure 4:
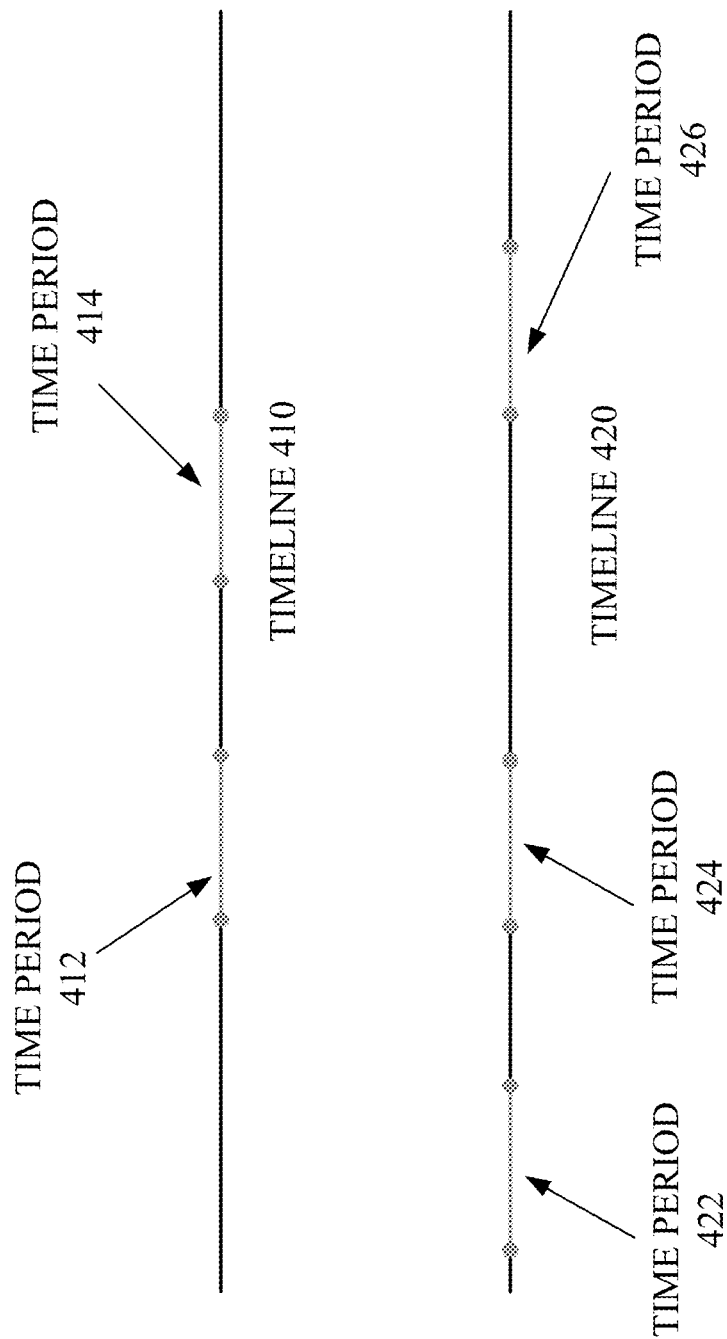
FIG. 4 depicts data generation timelines for two datasets, one of which depends on the other.

FIG. 4 depicts data generation timelines for two datasets, one of which depends on the other. Datasets are often generated based on a given timeline. The timeline may be based on a predetermined scheduled. For example, a first dataset may be generated twice a week, for example on Tuesdays and Thursdays. This is illustrated by time periods 412 and 414 on timeline 410 which represent the data generation timeline of the first dataset. A second dataset may be generated three times a week, for example, on Sundays, Tuesdays and Fridays. Timeline 420 represents the data generation timeline for the second datasets. Time period 422 illustrates data generation on Sunday, while time period 424 represents data generation on Tuesday and time period 426 symbolizes data generation on Friday.

When the second dataset depends on the first dataset, the data generation dates as well as the date an error occurred may be examined to ensure redundancy is identified correctly. In this example, if an error relating to the first dataset occurs during the time period 412 (e.g., on Tuesday), an error relating to the second dataset occurring on Tuesday may be identified as redundant, because the second dataset is being generated on the same date as when the error in the downstream dataset (first dataset) occurs. However, when the active error for the first dataset is for time period 412, a new error relating to the second dataset which is received during or after the time period 426 may not be redundant to the active error, because both the first dataset and the second datasets were generated again subsequent to time period 412. Thus, the new error for the second dataset is likely not redundant to the active error as they relate to different time periods.

Furthermore, different datasets may consume data from different time windows of an upstream dataset. In an example, even though the second dataset is created three times a week, it may consume data from the last 30 days of the first dataset to generate its data. In this example, if an active error exists for the first dataset for any of the last 30 days of data, the error may be redundant for a new error received for the second dataset. To ensure, such time dependencies are taken into account, the lineage service 232 of FIG. 1 may maintain or access dataset generation schedules and time widow of input datasets and take those time periods into account, when determining dependencies. This results in more accurate data alert suppression.

Figure 5:
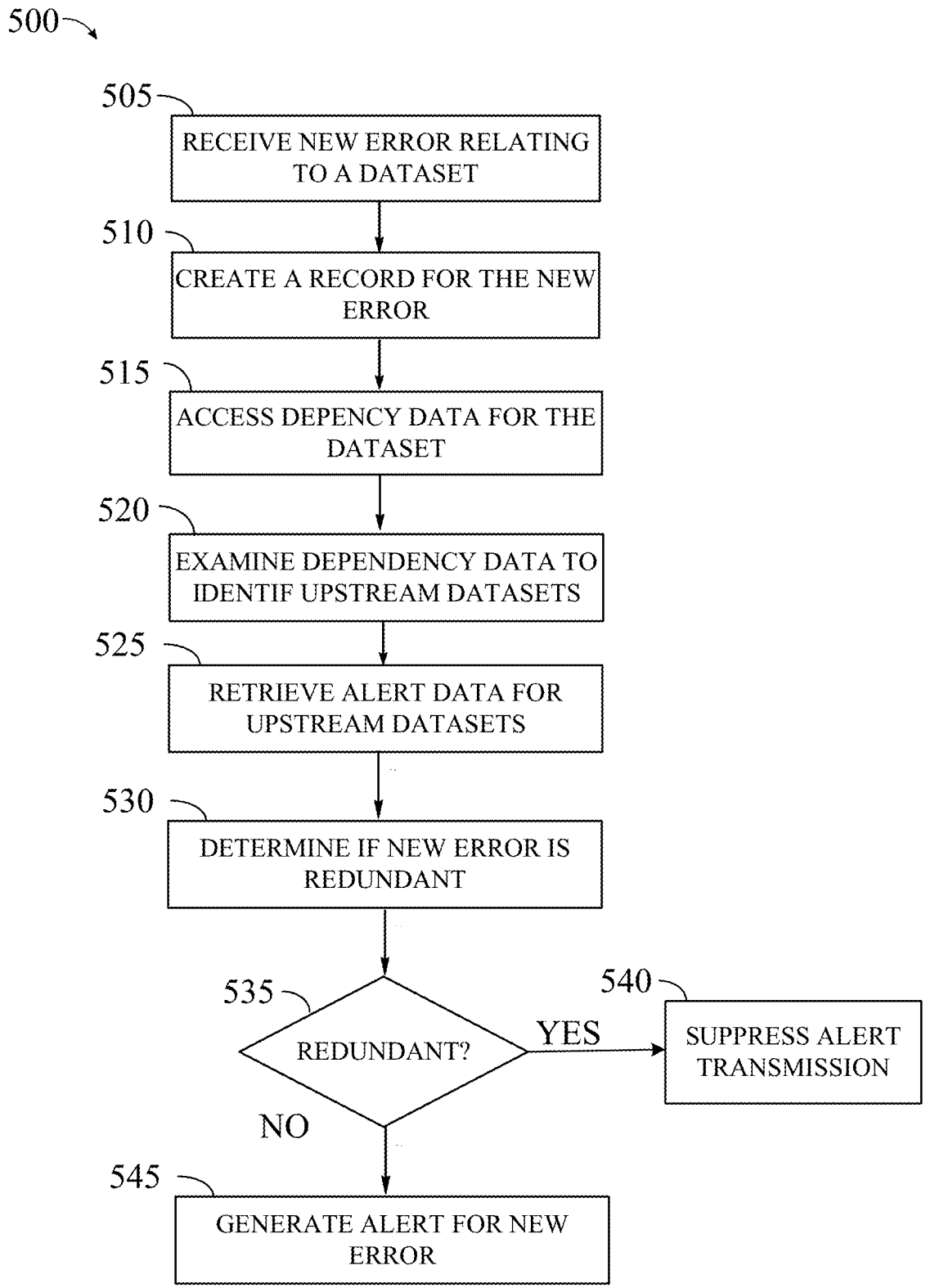
FIG. 5 is a flow diagram showing an example method for providing data alert suppression based on dataset dependencies.

FIG. 5 is a flow diagram depicting an example method 500 for providing suppression of data alerts based on dataset dependencies. In an example, one or more steps of method 500 may be performed by an alert server (e.g., alert server 220 of FIG. 2) or lineage server (e.g., lineage server 230 of FIG. 2). Other steps of method 500 may be performed by a storage server (e.g., storage server 240 of FIG. 2).

At 505, the method 500 may begin by receiving a new error for a dataset. The error may be received from a monitoring service that performs monitoring or testing of one or more datasets and may be received by the alert server. The error may be indicative of any erroneous behavior of the dataset and may include identification of incorrect or missing data. The error may include information about the dataset and/or properties of the dataset to which it relates. Furthermore, the error may include information such as the type of error and the date/time at which it was detected. Upon receiving the new error, a record for the new error may be created in a data structure, at 510. The data structure may maintain a list of errors for the system. The list may include active or inactive errors and may be updated as errors are resolved.

After creating a record for the new error, method 500 may proceed to access dependency data for the dataset to which the error relates, at 515. This may involve transmitting a request for determining the lineage of the dataset to a lineage server. The request may include information about the new error as well as information about all currently active alerts in the system. The dependency data may include a list of dependencies for one or more datasets in a system and may include one or more dependency trees. The dependency data may be generated by examining the input datasets used to generate each dataset, the time of generation of each dataset, the time window of input data consumption and/or dependency of properties in each dataset.

Once the dependency data is accessed, method 500 may proceed to examine the dependency data to automatically identify datasets that are upstream to the dataset at issue, at 520. This may involve examining the dependency data to identify datasets on which the dataset at issue depends. In determining this dependency, the data generation time and dataset properties may be examined.

Once the upstream datasets are identified, method 500 may proceed to retrieve alert data for the upstream datasets, at 525, before determining if the new error is redundant to an existing error for which an alert has been issued, at 530. This may involve examining the list of active alerts in the system and comparing this list to the list of upstream datasets to identify upstream datasets for which one or more active alerts exists. In some implementations, data generation time of the dataset and upstream dataset, detection or receiving time of the new error and/or dataset properties may be considered in determining the redundancy. When an active alert is identified for an upstream dataset, method 500 may identify the new error as redundant. When, however, no new active alerts are found for the upstream datasets, the new error may be identified as non-redundant. In some implementations, steps 520 and 425 of method 500 are executed in the reverse order, with alert data being queried first and then assessed against dependency data to identify upstream datasets having alerts.

When the new error is identified as redundant (yes at step 535), method 500 may proceed to suppress alert transmission for the new error, at 540. This may involve sending an indication that identifies the new error as redundant to an alert server. The indication may include information about the active alert to which the new error is redundant (e.g., the dataset to which the active alert relates). The record for the new error may then be updated to indicate that the error is redundant and as such does not require generation and transmission of an alert. In some implementations, information about the active alert may be stored in the record for the new error. In this manner, when the active alert is resolved, the record for the new error may be updated to indicate that the new error is also resolved. As discussed above, when alert transmission is suppressed, a report may be generated that includes a list of suppressed alerts for given datasets. Furthermore, a report may be generated for each active alert that identifies the errors the active alert has suppressed.

When the new error is not identified as redundant (no at step 535), method 500 may proceed to generate an alert for the new error, at 545. This may involve, automatic creation and transmission of an alert for the new error to one or more administrators responsible for managing the dataset to which the error relates. In some implementations, the record for the error is updated to indicate that an alert has been generated and/or transmitted for the error. Additionally, and/or alternatively, an alert record may be created for the new alert in an alert data structure (e.g., log of active alerts). The alert may include data about the error and the dataset to which it relates.

Figure 6:
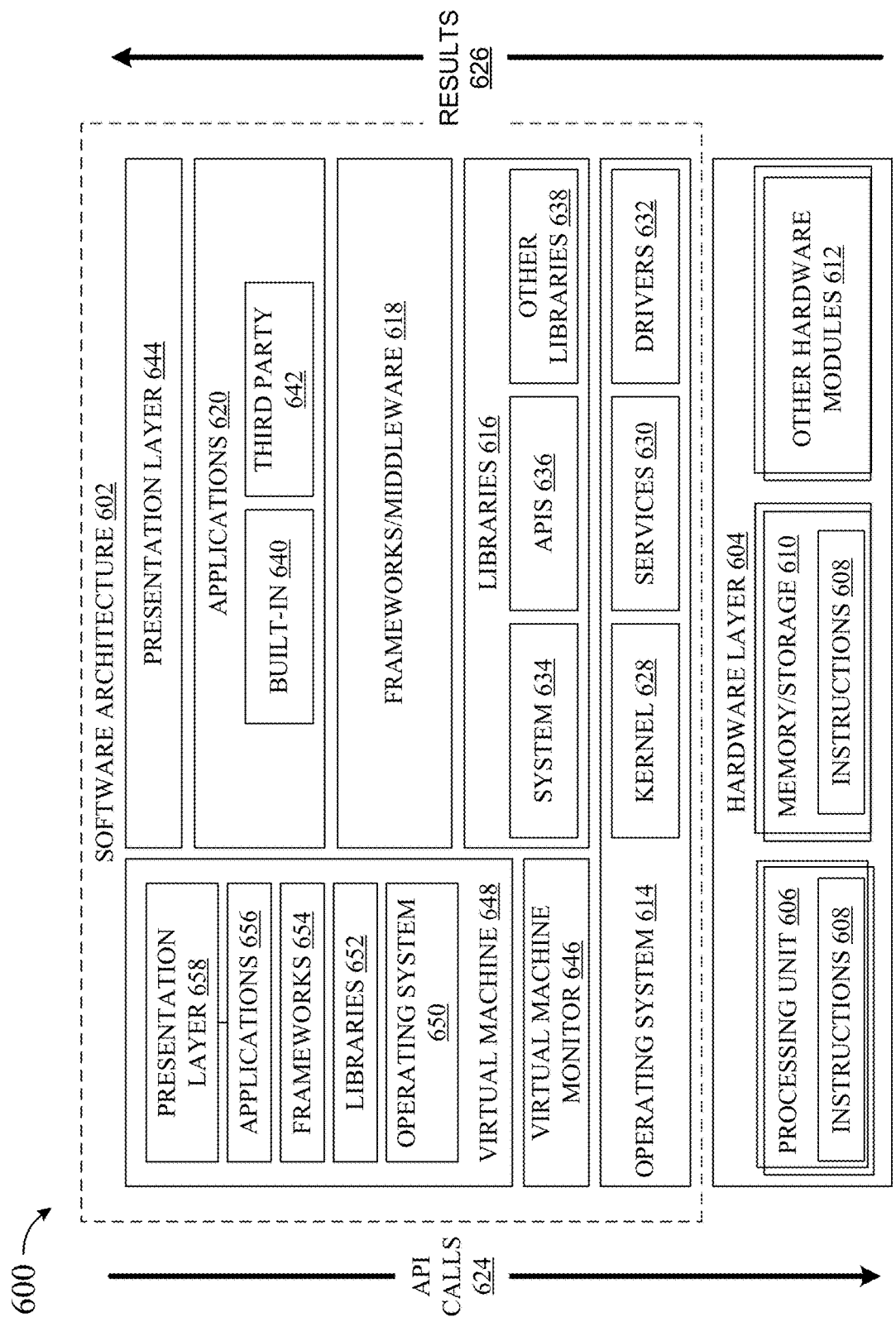
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
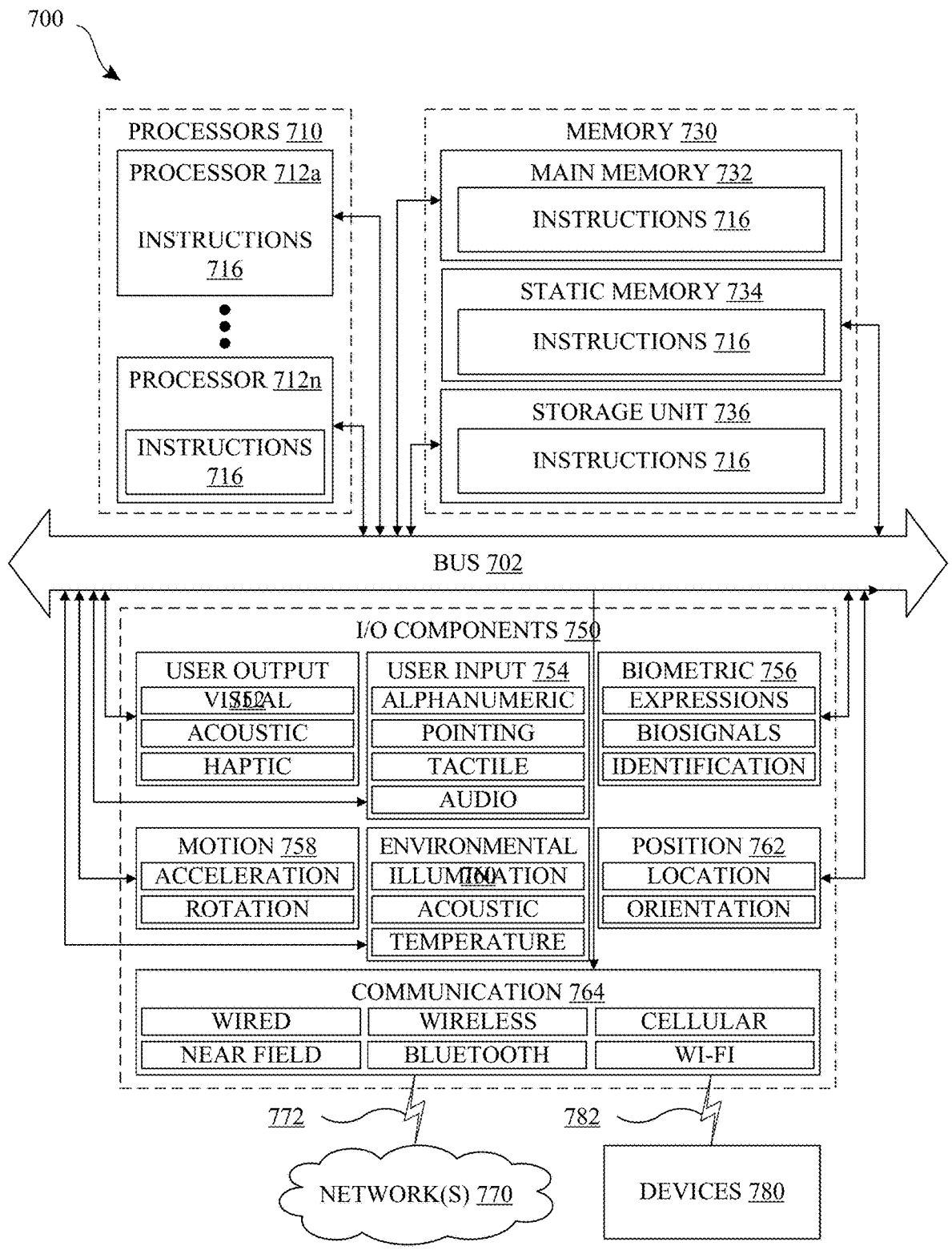
FIG. 7 is a block diagram illustrating components of an example machine configured to read instructions from a machine-readable medium and perform any of the features described herein.

FIG. 7 is a block diagram showing components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving, by an alert server, a first error associated with a first dataset, the first dataset being among a plurality of datasets in a computer data environment;
accessing dependency data that describes a set of dependencies between the first dataset and one or more other datasets in the computer data environment;
examining the dependency data to automatically identify a second dataset from among the one or more other datasets, the second dataset being a dataset on which the first dataset depends;
accessing alert data for the computer data environment to determine that an active alert for the second dataset indicates that the first error is redundant to a second error associated with the second dataset; and
in response to determining that the first error is redundant, suppressing transmission of an alert for the first error and storing data about the suppressed alert in a data structure of the computer data environment,
wherein determining that the first error is redundant to the second error is based on at least one of a timing of data generation of the first dataset, a timing of data generation of the second dataset and a timing of detection of the first error.

Item 2. The data processing system of item 1, wherein:
the second dataset includes a first property and a second property, and
in examining the dependency data, dependency of the first dataset on the first property and second property is examined to determine if the first dataset depends on one of the first property or the second property.

Item 3. The data processing system of item 2, wherein the memory further stores executable instructions that, when executed by the processor, cause the data processing system to perform functions of:
accessing information about the first error, the information indicating with which of the first property or the second property the first error is associated,
comparing the information with the dependency data to determine if the first error is associated with a same property on which the first dataset depends,
suppressing transmission of the alert for the first error when it is determined that the first error is associated with the same property on which the first dataset depends, and
transmitting the alert for the first error when it is determined that the first error is not associated with the same property on which the first dataset depends.

Item 4. The data processing system of any preceding item, wherein the memory further stores executable instructions that, when executed by the processor, cause the data processing system to perform a function of creating a record for storing information on the first error in a log.

Item 5. The data processing system of item 4, wherein the information includes at least one of the timing of detection of the first error, a type of the first error or an identifier for the first dataset.

Item 6. The data processing system of any preceding item, wherein the memory further stores executable instructions that, when executed by the processor, cause the data processing system to perform a function of creating a report of one or more errors associated with the first dataset for which transmission of the alert was suppressed within a given time period.

Item 7. The data processing system of any preceding item, wherein the memory further stores executable instructions that, when executed by the processor, cause the data processing system to perform a function of creating a report for one or more errors for which transmission of the alert was suppressed because of redundancy with the second error.

Item 8. A method for providing automatic suppression of an alert comprising:
  receiving, by an alert server, a first error associated with a first dataset, the first dataset being among a plurality of datasets in a computer data environment;
  accessing dependency data that describes a set of dependencies between the first dataset and one or more other datasets in the computer data environment;
  examining the dependency data to automatically identify a second dataset from among the one or more other datasets, the second dataset being a dataset on which the first dataset depends;
  accessing alert data for the computer data environment to determine that an active alert for the second dataset indicates that the first error is redundant to a second error associated with the second dataset; and
  in response to determining that the first error is redundant, suppressing transmission of an alert for the first error and storing data about the suppressed alert in a data structure of the computer data environment,
  wherein determining that the first error is redundant to the second error is based on at least one of a timing of data generation of the first dataset, a timing of data generation of the second dataset and a timing of detection of the first error.

Item 9. The method of item 8, wherein:
  the second dataset includes a first property and a second property, and
  in examining the dependency data, dependency of the first dataset on the first property and second property is examined to determine if the first dataset depends on one of the first property or the second property.

Item 10. The method of item 9, further comprising:
  accessing information on the first error, the information indicating with which of the first property or the second property the first error is associated,
  comparing the information with the dependency data to determine if the first error is associated with a same property on which the first dataset depends,
  suppressing transmission of the alert for the first error when it is determined that the first error is associated with the same property on which the first dataset depends, and
  transmitting the alert for the first error when it is determined that the first error is not associated with the same property on which the first dataset depends.

Item 11. The method of any of items 8-10, further comprising creating a record for storing information on the first error in a log.

Item 12. The method of any of items 8-11, further comprising creating a report of one or more errors associated with the first dataset for which transmission of the alert was suppressed within a given time period.

Item 13. The method of any of items 8-12, further comprising creating a report for one or more errors for which transmission of the alert was suppressed because of redundancy with the second error.

Item 14. A non-transitory computer readable medium on which are stored instructions that when executed cause a programmable device to:
  receive, by an alert server, a first error associated with a first dataset, the first dataset being among a plurality of datasets in a computer data environment;
  access dependency data that describes a set of dependencies between the first dataset and one or more other datasets in the computer data environment;
  examine the dependency data to automatically identify a second dataset from among the one or more other datasets, the second dataset being a dataset on which the first dataset depends;
  access alert data for the computer data environment to determine that an active alert for the second dataset indicates that the first error is redundant to a second error associated with the second dataset; and
  in response to determining that the first error is redundant, suppress transmission of an alert for the first error and storing data about the suppressed alert in a data structure of the computer data environment,
  wherein determining that the first error is redundant to the second error is based on at least one of a timing of data generation of the first dataset, a timing of data generation of the second dataset and a timing of detection of the first error.

Item 15. The non-transitory computer readable medium of item 14, wherein:
  the second dataset includes a first property and a second property, and
  in examining the dependency data, dependency of the first dataset on the first property and second property is examined to determine if the first dataset depends on one of the first property or the second property.

Item 16. The non-transitory computer readable medium of item 15, wherein the instructions further cause the programmable device to:
  access information on the first error, the information indicating with which of the first property or the second property the first error is associated,
  compare the information with the dependency data to determine if the first error is associated with a same property on which the first dataset depends,
  suppress transmission of the alert for the first error when it is determined that the first error is associated with the same property on which the first dataset depends, and
  transmit the alert for the first error when it is determined that the first error is not associated with the same property on which the first dataset depends.

Item 17. The non-transitory computer readable medium of any of items 14-16, wherein the instructions further cause the programmable device to create a record for storing information about the first error in a log.

Item 18. The non-transitory computer readable medium of item 17, wherein the information includes at least one of the timing of detection of the first error, a type of the first error or an identifier for the first dataset.

Item 19. The non-transitory computer readable medium of any of items 14-18, wherein the instructions further cause the programmable device to create a report of one or more errors associated with the first dataset for which transmission of the alert was suppressed within a given time period.

Item 20. The non-transitory computer readable medium of any of items 14-19, wherein the instructions further cause the programmable device to create a report for one or more errors for which transmission of the alert was suppressed because of redundancy with the second error.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving, by an alert server, a first error associated with a first dataset, the first dataset being a dataset for storing data in a computer data environment, the computer data environment including a plurality of datasets, wherein each of the plurality of datasets stores data relating to a data category, and at least one of the plurality of datasets is provided as an input for generating another one of the plurality of datasets;
accessing dependency data that describes a set of dependencies between the first dataset and one or more other datasets in the computer data environment;
examining the dependency data to automatically identify a second dataset from among the one or more other datasets, the second dataset being a dataset on which the first dataset depends;
accessing alert data for the computer data environment to determine that an active alert for the second dataset indicates that the first error is redundant to a second error associated with the second dataset; and
in response to determining that the first error is redundant, suppressing transmission of an alert for the first error and storing data about the suppressed alert in a data structure of the computer data environment,
wherein determining that the first error is redundant to the second error is based on at least one of a timing of data generation of the first dataset, a timing of data generation of the second dataset and a timing of detection of the first error.

2. The data processing system of claim 1, wherein:
the second dataset includes a first property and a second property, and
in examining the dependency data, dependency of the first dataset on the first property and second property is examined to determine if the first dataset depends on one of the first property or the second property.

3. The data processing system of claim 2, wherein the memory further stores executable instructions that, when executed by the processor, cause the data processing system to perform functions of:
accessing information about the first error, the information indicating with which of the first property or the second property the first error is associated,
comparing the information with the dependency data to determine if the first error is associated with a same property on which the first dataset depends,
suppressing transmission of the alert for the first error when it is determined that the first error is associated with the same property on which the first dataset depends, and
transmitting the alert for the first error when it is determined that the first error is not associated with the same property on which the first dataset depends.

4. The data processing system of claim 1, wherein the memory further stores executable instructions that, when executed by the processor, cause the data processing system to perform a function of creating a record for storing information on the first error in a log.

5. The data processing system of claim 4, wherein the information includes at least one of the timing of detection of the first error, a type of the first error or an identifier for the first dataset.

6. The data processing system of claim 1, wherein the memory further stores executable instructions that, when executed by the processor, cause the data processing system to perform a function of creating a report of one or more errors associated with the first dataset for which transmission of the alert was suppressed within a given time period.

7. The data processing system of claim 1, wherein the memory further stores executable instructions that, when executed by the processor, cause the data processing system to perform a function of creating a report for one or more errors for which transmission of the alert was suppressed because of redundancy with the second error.

8. A method for providing automatic suppression of an alert comprising:
   receiving, by an alert server, a first error associated with a first dataset, the first dataset being a dataset for storing data in a computer data environment, the computer data environment including a plurality of datasets, wherein each of the plurality of datasets stores data relating to a data category, and at least one of the plurality of datasets is provided as an input for generating another one of the plurality of datasets;
   accessing dependency data that describes a set of dependencies between the first dataset and one or more other datasets in the computer data environment;
   examining the dependency data to automatically identify a second dataset from among the one or more other datasets, the second dataset being a dataset on which the first dataset depends;
   accessing alert data for the computer data environment to determine that an active alert for the second dataset indicates that the first error is redundant to a second error associated with the second dataset; and
   in response to determining that the first error is redundant, suppressing transmission of the alert for the first error and storing data about the suppressed alert in a data structure of the computer data environment,
   wherein determining that the first error is redundant to the second error is based on at least one of a timing of data generation of the first dataset, a timing of data generation of the second dataset and a timing of detection of the first error.

9. The method of claim 8, wherein:
   the second dataset includes a first property and a second property, and
   in examining the dependency data, dependency of the first dataset on the first property and second property is examined to determine if the first dataset depends on one of the first property or the second property.

10. The method of claim 9, further comprising:
    accessing information on the first error, the information indicating with which of the first property or the second property the first error is associated,
    comparing the information with the dependency data to determine if the first error is associated with a same property on which the first dataset depends,
    suppressing transmission of the alert for the first error when it is determined that the first error is associated with the same property on which the first dataset depends, and
    transmitting the alert for the first error when it is determined that the first error is not associated with the same property on which the first dataset depends.

11. The method of claim 8, further comprising creating a record for storing information on the first error in a log.

12. The method of claim 8, further comprising creating a report of one or more errors associated with the first dataset for which transmission of the alert was suppressed within a given time period.

13. The method of claim 8, further comprising creating a report for one or more errors for which transmission of the alert was suppressed because of redundancy with the second error.

14. A non-transitory computer readable medium on which are stored instructions that when executed cause a programmable device to:
    receive, by an alert server, a first error associated with a first dataset, the first dataset being a dataset for storing data in a computer data environment, the computer data environment including a plurality of datasets, wherein each of the plurality of datasets stores data relating to a data category, and at least one of the plurality of datasets is provided as an input for generating another one of the plurality of datasets;
    access dependency data that describes a set of dependencies between the first dataset and one or more other datasets in the computer data environment;
    examine the dependency data to automatically identify a second dataset from among the one or more other datasets, the second dataset being a dataset on which the first dataset depends;
    access alert data for the computer data environment to determine that an active alert for the second dataset indicates that the first error is redundant to a second error associated with the second dataset; and
    in response to determining that the first error is redundant, suppress transmission of an alert for the first error and storing data about the suppressed alert in a data structure of the computer data environment,
    wherein determining that the first error is redundant to the second error is based on at least one of a timing of data generation of the first dataset, a timing of data generation of the second dataset and a timing of detection of the first error.

15. The non-transitory computer readable medium of claim 14, wherein:
    the second dataset includes a first property and a second property, and
    in examining the dependency data, dependency of the first dataset on the first property and second property is examined to determine if the first dataset depends on one of the first property or the second property.

16. The non-transitory computer readable medium of claim 15, wherein the instructions further cause the programmable device to:
    access information on the first error, the information indicating with which of the first property or the second property the first error is associated,
    compare the information with the dependency data to determine if the first error is associated with a same property on which the first dataset depends,
    suppress transmission of the alert for the first error when it is determined that the first error is associated with the same property on which the first dataset depends, and
    transmit the alert for the first error when it is determined that the first error is not associated with the same property on which the first dataset depends.

17. The non-transitory computer readable medium of claim 14, wherein the instructions further cause the programmable device to create a record for storing information about the first error in a log.

18. The non-transitory computer readable medium of claim 17, wherein the information includes at least one of the timing of detection of the first error, a type of the first error or an identifier for the first dataset.

19. The non-transitory computer readable medium of claim 14, wherein the instructions further cause the programmable device to create a report of one or more errors associated with the first dataset for which transmission of the alert was suppressed within a given time period.

20. The non-transitory computer readable medium of claim 14, wherein the instructions further cause the programmable device to create a report for one or more errors for which transmission of the alert was suppressed because of redundancy with the second error.

* * * * *